(12) United States Patent
Eslami (10) Patent No.: US 10,097,829 B2
(45) Date of Patent: Oct. 9, 2018

(54) SYSTEM AND METHOD FOR COMPRESSION OF DIGITAL CONTENT

(71) Applicant: SONY CORPORATION, Tokyo (JP)

(72) Inventor: Ramin Eslami, Milpitas, CA (US)

(73) Assignee: SONY CORPORATION, Tokyo (JP)

( * ) Notice: Subject to any disclaimer, the term of this patent is extended or adjusted under 35 U.S.C. 154(b) by 395 days.

(21) Appl. No.: 14/921,761

(22) Filed: Oct. 23, 2015

(65) Prior Publication Data

US 2017/0118471 A1  Apr. 27, 2017

(51) Int. Cl.
*H04N 19/124* (2014.01)
*H04N 19/176* (2014.01)
*H04N 19/91* (2014.01)

(52) U.S. Cl.
CPC ......... *H04N 19/124* (2014.11); *H04N 19/176* (2014.11); *H04N 19/91* (2014.11)

(58) Field of Classification Search
CPC ..... H04N 19/124; H04N 19/182; H04N 19/34
See application file for complete search history.

(56) References Cited

U.S. PATENT DOCUMENTS

| 7,702,170 | B2 | 4/2010 | Hu |
| 8,634,668 | B2 | 1/2014 | Gharavi-Alkhansari et al. |
| 2011/0292247 | A1* | 12/2011 | Gharavi-Alkhansari ............ H04N 19/176 348/231.99 |
| 2015/0201191 | A1* | 7/2015 | Cheong ................ H04N 19/176 382/166 |

OTHER PUBLICATIONS

Rehna. V. J et al, "Improving the Performance of Wavelet Based Image Compression Using SPIHT Algorithm", IRNET Transactions on Electrical and Electronics Engineering ISSN 2319-2557, 2012, pp. 5, vol. 1, ISS-2, Bangalore, India.

* cited by examiner

*Primary Examiner* — Sathyanaraya V Perungavoor
*Assistant Examiner* — Peet Dhillon
(74) *Attorney, Agent, or Firm* — Chip Law Group (57) ABSTRACT

Various aspects of a system and method for block-based compression of digital content are disclosed herein. The method comprises quantization, by an encoder, of each block of a plurality of blocks of a digital content based on a computed quantization value. A differential pulse code modulation (DPCM) is computed, by the encoder, to generate quantized residuals of the quantized plurality of blocks. Entropy coding on each of the quantized plurality of blocks is performed by the encoder based on the generated quantized residuals. A compressed bitstream of the digital content is generated by the encoder. The compressed bitstream that comprises depth-first refinement of the entropy-coded quantized plurality of blocks, is generated.

22 Claims, 6 Drawing Sheets

SYSTEM AND METHOD FOR COMPRESSION OF DIGITAL CONTENT

FIELD

Various embodiments of the disclosure relate to a system and method for compression of digital content. More specifically, various embodiments of the disclosure relate to a system and method for block-based compression of digital content, based on differential pulse code modulation (DPCM).

BACKGROUND

Recent advancements in the field of digital content processing have led to the development of various embedded image codecs for encoding and decoding digital data or multimedia stream, such as images and/or videos. Typically, an encoder in a device, such as an endoscopic camera, may compress a raw video captured by communicatively coupled video-capturing unit. The encoder may utilize various lossless image compression techniques, such as differential pulse-code modulation (DPCM) and/or entropy encoding, to encode the captured raw video and generate a bitstream with a pre-determined compression, such as 50 percent). The generated bitstream may be transmitted to a decoder, such as a console computing device, which may decompress the received bitstream to reproduce the captured video. The reproduced video may be rendered at a display screen associated with the console computing device.

However, in such scenarios, the generated bitstream may be transmitted in a sequence of bitplane slices. Consequently, the decoded video may not be reproduced in real-time or near real-time at the console computing device due to various processing overheads. Therefore, fast implementation of the codecs may be desired to provide a real-time rendering of the decoded video with visually lossless results at the console computing device.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for compression of digital content is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various implementations may be found in a system and/or a method for block-based compression of digital content. Exemplary aspects of the disclosure may comprise a method that includes quantization, by an encoder, of each block of a plurality of blocks of digital content, based on a computed quantization value. The method may further comprise computation, by the encoder, of a differential pulse code modulation (DPCM) of the quantized plurality of blocks to generate quantized residuals. The method may further comprise performing, by the encoder, entropy coding on each of the quantized plurality of blocks based on the generated quantized residuals. The method may further comprise generation of a compressed bitstream, by the encoder, based on digital content. Generation of the bitstream may comprise depth-first refinement of the plurality of blocks.

In accordance with an embodiment, a bitdepth of the plurality of blocks may be determined by the encoder, for depth-first refinement. The determined bitdepth of the plurality of blocks may be based on a size of a block in the plurality of blocks, the computed quantization value, and a count of bits for refinement from each of the quantized plurality of blocks.

In accordance with an embodiment, generation of the compressed bitstream may be based on a determination of a count of bits for refinement in each of the quantized plurality of blocks. The determination of the count of bits for refinement may be based on a number of bits of the plurality of blocks that are entropy-coded. The determination of the count of bits for refinement may be based on a number of bits of the plurality of blocks.

In accordance with an embodiment, generation of the compressed bitstream may be based on a degree of compression of the plurality of blocks. The degree of compression may correspond to one of a user-defined value or a pre-stored value. In accordance with an embodiment, the quantization of each block of the plurality of blocks may be based on a computed quantization value determined by the mode decision unit. Further, the entropy coding may be performed based on one of Golomb coding, Universal coding, Huffman coding, or Arithmetic coding.

Another exemplary aspect of the disclosure may comprise a method for block-based decompression of digital content. The method comprises reception of a compressed bitstream of the digital content that comprises a quantized plurality of blocks at a decoder. The method further comprises decoding, by the decoder, a precomputed quantization value from a plurality of bits of the compressed bitstream, received by the decoder. The method further comprises decoding a plurality of quantized residuals based on the decoded precomputed quantization value. Each of the decoded plurality of quantized residuals corresponds to a quantized block of the quantized plurality of blocks. The method further comprises determining a plurality of quantized samples, by the decoder, based on the decoded plurality of quantized residuals. The method further comprises reading, by the decoder, one or more refinement bits in a depth-first sequence from the determined plurality of samples for the decompression of the digital content.

In accordance with an embodiment, the received compressed bitstream of the digital content may be entropy-coded. Further, the decoding of the received compressed bitstream may be based on a differential pulse code modulation (DPCM) decoder.

Figure 1:
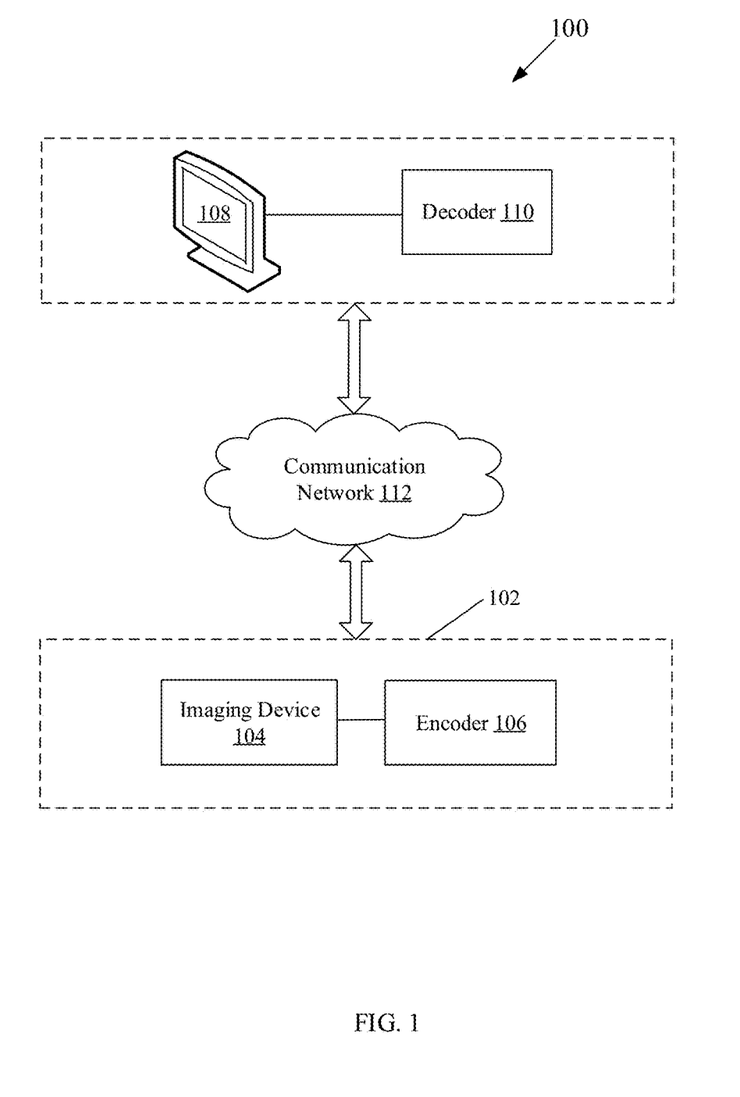
FIG. 1 is a block diagram that illustrates a network diagram of block-based compression and decompression of digital content, in accordance with an embodiment of the disclosure.

FIG. 1 is a block diagram that illustrates a network environment for block-based compression and decompression of digital content, in accordance with an embodiment of the disclosure. With reference to FIG. 1, there is shown a network environment 100. The network environment 100 may include an electronic device 102. The electronic device 102 may further include an imaging device 104 and an encoder 106. The network environment 100 may further include a display device 108. The display device 108 may further include a decoder 110. The electronic device 102 and the display device 108 may be communicatively coupled with each other, via the communication network 112.

The electronic device 102 may comprise suitable logic, circuitry, interfaces, and/or code that may be configured to process digital content that comprises one or more images and/or videos. The imaging device 104 of the electronic device 102 may be configured to capture the one or more images and/or videos. The encoder 106 of the electronic device 102 may be configured to encode the one or more images and/or videos of the digital content to generate a compressed bitstream. The electronic device 102 may be further configured to transmit the compressed bitstream to the display device 108, via the communication network 112. Examples of the electronic device 102 may include, but are not limited to, an endoscopic device, personal computer, a laptop computer, a computer workstation, a mainframe computer, a handheld computer, a personal digital assistant, a cellular/mobile telephone, a smart appliance, a gaming console, a digital camera, a digital camcorder, a camera phone, a video player, a DVD writer/player, a television.

The imaging device 104 may comprise suitable logic, circuitry, interfaces, and/or code that may be configured to capture one or more images and/or videos within a field-of-view of the imaging device 104. The imaging device 104 may include a lens assembly and an image sensor that may enable the imaging device 104 to capture the one or more images. The image sensor of the imaging device 104 may be implemented by use of a charge-coupled device (CCD) technology or complementary metal-oxide-semiconductor (CMOS) technology. Examples of the imaging device 104 may include a digital camera, a digital camcorder, a camera phone, and/or an endoscopic camera.

The encoder 106 may comprise suitable logic, circuitry, interfaces, and/or code that may be configured to encode the one or more images and/or videos captured by the imaging device 104. The encoder 106 may be configured to encode the one or more images and/or videos to generate the compressed bitstream. The encoder 106 may utilize one or more known technologies, such as differential pulse-code modulation (DPCM) and Joint Photographic Experts Group (JPEG).

The display device 108 may comprise suitable logic, circuitry, interfaces, and/or code that may be configured to receive the compressed bitstream from the electronic device 102. The decoder 110 may be configured to decode the compressed bitstream (received from the electronic device 102) to determine the one or more images of the digital content based on one or more decoding techniques known in the art. The display device 108 may be configured to render the decoded digital content. Examples of the display device 108 may include, but are not limited to, a laptop, a tablet computer, a smartphone, and/or a Personal Digital Assistant (PDA) device.

The decoder 110 may comprise suitable logic, circuitry, interfaces, and/or code that may be configured to decode the compressed bitstream received from the electronic device 102. Further, the decoder 110 may be configured to generate the one or more images based on the decoding of the compressed bitstream. The decoder 110 may utilize one or more known technologies known in the art to decode the received bitstream. A person ordinary skilled in the art will understand that the decoder 110 may be implemented in the electronic device 102, without deviation from the scope of the disclosure. In such a scenario, the display device 108 may be directly coupled to the electronic device 102.

The communication network 112 may include a medium through which the electronic device 102 may communicate with the display device 108. Examples of the communication network 112 may include, but are not limited to, the Internet, a cloud network, a Long Term Evolution (LTE) network, a Wireless Fidelity (Wi-Fi) network, a Wireless Local Area Network (WLAN), a Local Area Network (LAN), a telephone line (POTS), and/or a Metropolitan Area Network (MAN). Various devices in the network environment 100 may be operable to connect to the communication network 112, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), Hypertext Transfer Protocol Secure (HTTPS), File Transfer Protocol (FTP), Zigbee, EDGE, infrared (IR), IEEE 802.11, 802.16, cellular communication protocols, and/or Bluetooth (BT) communication protocols.

In operation, the electronic device 102 may be configured to capture digital content, such as one or more images or videos, by use of the imaging device 104. The encoder 106 of the electronic device 102 may be configured to divide an image of the captured one or more images into a plurality of blocks. Each block of the plurality of blocks may comprise one or more pixels. The number of pixels in each block may be determined based on a corresponding size of the block. The size of the block may be based on a pre-determined value, such as "32×1 pixels". Each pixel in the block may be further represented by one or more bits, such as a combination of eight bits. Number of bits in the one or more bits may correspond to a first bitdepth.

In accordance with an embodiment, a bit number of a bit, in the one or more bits, for each of the one or more pixels in the block may correspond to a bitplane of the block. For example, if the block comprises "32 pixels", and each pixel is represented by eight bits, the first bit of each pixel may correspond to a first bitplane. Similarly, the second bit of each pixel may correspond to a second bitplane. Therefore, in the block, there may be eight bitplanes. In accordance with an embodiment, the block may comprise the one or more pixels and each of the one or more pixels may be represented by the one or more bits. Thus, the block comprises a plurality of bits.

In accordance with an embodiment, the encoder 106 may be configured to compute a quantization value. In accordance with an embodiment, the quantization value may be computed by a mode decision unit 204a that may be communicatively coupled to the encoder 106. The encoder 106 may be configured to determine a first number of bits from the one or more bits (which represent the pixel). The encoder 106 may be further configured to quantize the determined first number of bits of the one or more bits, based on the computed quantization value. The quantized first number of bits of the one or more bits may correspond to a plurality of quantized bits. Notwithstanding, the disclosure may not be so limited, and the quantization value may correspond to a parameter provided by a user (not shown), without departure from the scope of the disclosure.

In accordance with an embodiment, the encoder 106 may be configured to compute a DPCM of the plurality of quantized bits. Based on the computation of the DPCM, the encoder 106 may be configured to determine a residual for each bit in the plurality of bits. Therefore, the block may comprise a plurality of residuals.

The encoder 106 may be configured to quantize the determined plurality of residuals. The encoder 106 may be further configured to determine the plurality of quantized residuals for source coding. The determination of the plurality of quantized residuals may be based on the computed quantization value and/or the first bitdepth. The encoder 106 may be further configured to perform source coding on the determined plurality of quantized residuals. The source coding may be based on a lossless coding technique, such as entropy coding. Examples of the techniques for entropy coding of the quantized residuals, may include, but are not limited to, unary coding, exponential Golomb coding, and/or Huffman coding. In accordance with an embodiment, the encoder 106 may be further configured to perform source coding on each of the quantized residuals of the plurality of blocks.

In accordance with an embodiment, selection of the plurality of quantized residuals may correspond to the selection of the first portion of the plurality of bits. In accordance with an embodiment, the first portion of the plurality of bits may store the corresponding value of the plurality of quantized residuals. The first portion of the plurality of bits may be selected in such a manner that a first predefined number of bits of the one or more bits (which represent the pixel) may correspond to the first portion. Hereinafter, the selection of the plurality of quantized residuals, and the selection of the first portion of the plurality of bits have been interchangeably used.

In accordance with an embodiment, the encoder 106 may be further configured to assign header bits at the start of the bitstream. The header bits may be used to store information, such as the quantization value.

In accordance with an embodiment, for each of the one or more pixels in the block, the encoder 106 may be configured to determine a second number of bits from the one or more bits (which represent the pixel), for refinement pass. In accordance with an embodiment, the determination of the second number of bits may be based on a second bitdepth associated with each of the one or more pixels in the block. The determination of the second bitdepth may be based on the size of the block, the computed quantization value, and a count of bits in the header bits.

In accordance with an embodiment, the second number of bits for each of the one or more pixels may together constitute a second portion of the plurality of bits. In accordance with an embodiment, the encoder 106 may be configured to generate a compressed bitstream, based on the depth-first refinement of the second portion of the plurality of bits and the source coding of the first portion of the plurality of residuals. In accordance with an embodiment, after generation of the compressed bitstream, the electronic device 102 may be configured to transmit the generated compressed bitstream to the display device 108, via the communication network 112.

In accordance with an embodiment, the display device 108 may be configured to receive the compressed bitstream. The decoder 110 of the display device 108 may be configured to decode and decompress the received bitstream, based on one or more techniques, such as Compute Unified Device Architecture (CUDA) language known in the art. The decoder 110 may be configured to determine the quantization value from the header bits of the received compressed bitstream and the size of the plurality of blocks from the memory that may be associated with the decoder 110. Further, the decoder 110 may be configured to determine the block from the received bitstream, based on the size of the plurality of blocks. The block determined by the decoder 110 includes the source-coded residuals (such as the first portion) and the refined bits (such as the second portion). The decoder 110 may be configured to decode the source coded residuals (such as the first portion) to obtain the plurality of quantized residuals.

In accordance with an embodiment, the decoder 110 may be configured to demodulate the plurality of quantized residuals to determine the first portion of the one or more bits for each of the one or more pixels in the block, based on an inverse DPCM demodulation technique. In accordance with an embodiment, the decoder 110 may be configured to refine the first and second portion of bits form the decoded bits. Based on the decoded bits, the display device 108 may render the digital content.

Figure 2:
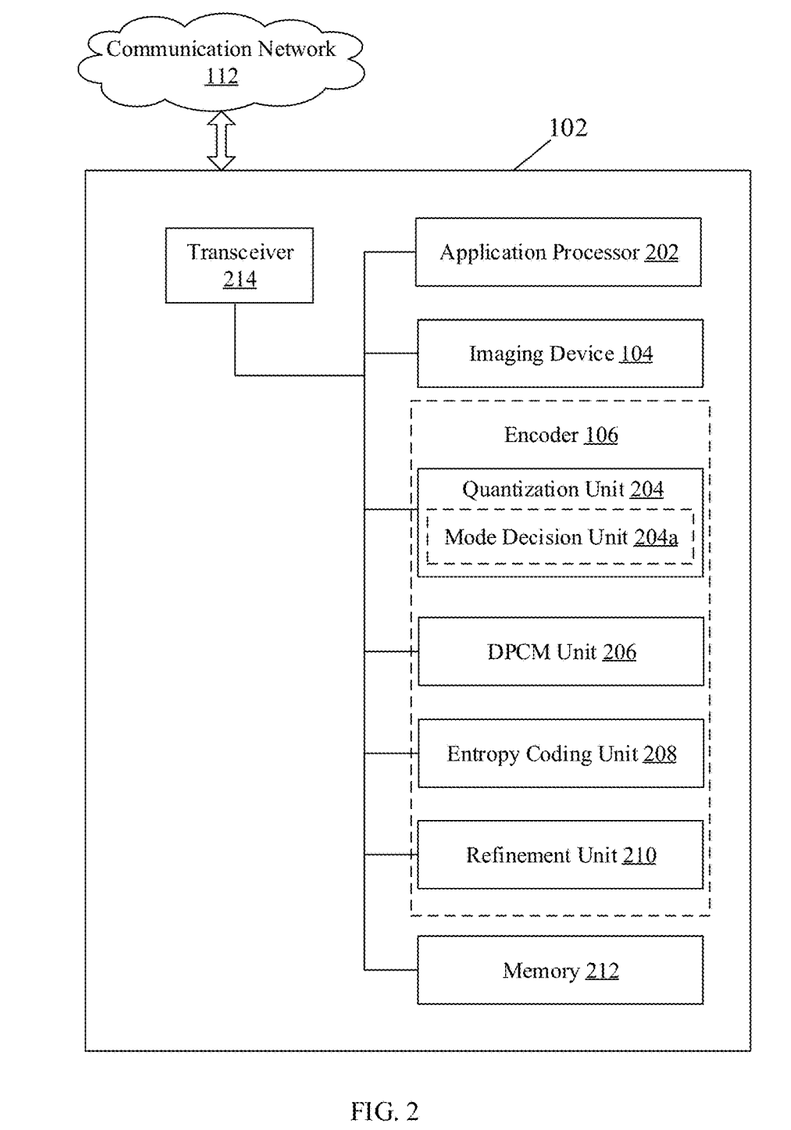
FIG. 2 is a detailed block diagram that illustrates an exemplary electronic device for block-based compression of digital content, in accordance with an embodiment of the disclosure.

FIG. 2 is a detailed block diagram that illustrates the electronic device for block-based compression of digital content, in accordance with an embodiment of the disclosure. FIG. 2 is explained in conjunction with elements from FIG. 1. With reference to FIG. 2, the electronic device 102 may comprise one or more circuits, such as an application processor 202, an imaging device 104, and the encoder 106. The encoder 106 may further include a quantization unit 204, a DPCM unit 206, an entropy coding unit 208, and a refinement unit 210. The quantization unit may comprise a mode decision unit 204a. The electronic device 102 may further include a memory 212, and a transceiver 214. The imaging device 104, the quantization unit 204, the DPCM unit 206, the entropy coding unit 208, the refinement unit 210, the memory 212 may be communicatively connected to the application processor 202.

The application processor 202 may comprise suitable logic, circuitry, interfaces, and/or code that may be operable to execute a set of instructions stored in the memory 212. The application processor 202 may be configured to instruct the imaging device 104 to capture one or more images and/or videos. Further, the application processor 202 may be configured to instruct the quantization unit 204, the DPCM unit 206, the entropy coding unit 208, and/or the refinement unit 210, to generate a compressed bitstream of the captured one or more images and/or videos. The application processor 202 may be implemented based on a number of processor technologies known in the art.

The quantization unit 204 may comprise suitable logic, circuitry, interfaces, and/or code that may be configured to divide each of the one or more images in the plurality of blocks (as described in FIG. 1). The mode decision unit 204a of the quantization unit 204 may be configured to determine a quantization value. Based on the determined quantization value, the quantization unit 204 may be configured to quantize each of the plurality of blocks. In accordance with an embodiment, the quantization unit 204 may utilize one or more known technologies, such as uniform quantization, to quantize the plurality of blocks. The quantization unit 204 may be implemented, based on a number of technologies known in the art.

The DPCM unit 206 may comprise suitable logic, circuitry, interfaces, and/or code that may be configured to compute DPCM of the plurality of bits in each of the plurality of quantized blocks to generate the plurality of residuals. The DPCM unit 206 may be implemented on an Application Specific Integrated Circuit (ASIC) or Field Programmable Gate Array (FPGA). In an implementation, the quantization unit 204 may be implemented on the same ASIC as the DPCM unit 206.

The entropy coding unit 208 may comprise suitable logic, circuitry, interfaces, and/or code that may be configured to perform source coding of the plurality of residuals (obtained based on DPCM of the predefined number of bits). The entropy coding unit 208 may be implemented on an Application Specific Integrated Circuit (ASIC) or Field Programmable Gate Array (FPGA).

The refinement unit 210 may comprise suitable logic, circuitry, interfaces, and/or code that may be configured to add refinement bits from the second portion of plurality of bits to the bitstream. The refinement unit 210 may be implemented on an Application Specific Integrated Circuit (ASIC) or a Field Programmable Gate Array (FPGA).

The memory 212 may comprise suitable logic, circuitry, and/or interfaces that may be operable to store a machine readable code and/or a computer program with at least one code section executable by the application processor 202, the imaging device 104, the quantization unit 204, the DPCM unit 206, the entropy coding unit 208, and the refinement unit 210. The memory 212 may be configured to store one or more parameters that include, but are not limited to, a degree of compression, the size of a block, and/or the first bitdepth. The memory 212 may be further configured to store a mathematical algorithm that determines one or more bits for depth-first refinement. Examples of implementation of the memory 212 may include, but are not limited to, Random Access Memory (RAM), Read Only Memory (ROM), Hard Disk Drive (HDD), and/or a Secure Digital (SD) card.

The transceiver 214 may comprise suitable logic, circuitry, interfaces, and/or code that may be configured to transmit the compressed bitstream to the display device 108, via the communication network 112. The transceiver 214 may implement known technologies to support wired or wireless communication with the communication network 112. The transceiver 214 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 214 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120 g, IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the application processor 202 may instruct the imaging device 104 to capture the one or more images and/or videos. Thereafter, the one or more images may be transmitted to the quantization unit 204. In accordance with an embodiment, the quantization unit 204 may be configured to retrieve a pre-determined value of a size of a block, from the memory 212, such as, "32×1 pixels". In accordance with an embodiment, the size of the block may be based on a value provided in real time by a user (not shown).

The quantization unit 204 may be further configured to divide each of the one or more images and/or videos into the plurality of blocks based on the retrieved size of the plurality of blocks. For example, if an image is of size, "16×16 pixels", and the size retrieved from the memory is, "4×4", the quantization unit 204 divides the image or video into "4 blocks", where each block is of size, "4×4 pixels". In accordance with an embodiment, each of the plurality of blocks may comprise one or more pixels. Further, each of the one or more pixels may be represented by one or more bits. Therefore, each of the plurality of blocks may comprise a plurality of bits. For the purpose of brevity, the ongoing description has been explained with reference to a single block from the plurality of blocks of an image. However, the scope of the disclosure is not limited to a single block of the image. The scope of the disclosure may be extended to other blocks of the plurality of blocks of a video also. Further, the scope of the disclosure may be extended to other images of the one or more images and other videos of the one or more videos.

In accordance with an embodiment, a count of the one or more bits, which represent each of the one or more pixels, may correspond to the first bitdepth of the block. For example, if each pixel in each of a block is represented by eight bits, the first bitdepth may be a value "8". Further, in accordance with an embodiment, a bit number of each bit of the pixel in the block may correspond to a bitplane. For example, if the block comprises "32 pixels" and each pixel is represented by eight bits, the first bit of each pixel may correspond to a first bitplane. Similarly, the second bit of each pixel may correspond to a second bitplane. Therefore, in the block, there may be eight bitplanes. For example, if a block comprises two pixels, where a first pixel is represented by, "01101101" and a second pixel is represented by, "01110110", then the first bitplane may comprise least significant bit (LSB) of the one or more bits that represent the first pixel and the second pixel (such as "1" and "0"). In accordance with an embodiment, a count of bits in a bitplane is based on a number of pixels in a block. For example, if the count of the one or more pixels in the block is "32" and each of the one or more pixels is represented by eight bits, the block may comprise "8" bitplanes and each bitplane has "32 bits".

In accordance with an embodiment, the quantization unit 204 may be further configured to determine a bitbudget. The determination of the bitbudget may be based on a degree of compression retrieved from the memory 212. In an instance, the size of the block that comprises "32 pixels" of eight bits, may be computed as "256 bits". If the degree of compression is "50%", the bitbudget for the block may be, "128 bits". In accordance with an embodiment, the degree of compression may be provided in real time or in near-real time by a user.

The mode decision unit 204a of the quantization unit 204 may be configured to compute a quantization value. The determination of the quantization value may be computed based on the bitbudget. The quantization unit 204 may be configured to determine a first number of bits from the block. Based on the determined quantization value, the quantization unit 204 may be configured to quantize the determined first number of bits of the block, based on the computed quantization value. The quantized first number of bits of the one or more bits may correspond to a plurality of quantized bits. The quantization unit 204 may be further configured to communicate the quantized block, which comprises the plurality of quantized bits, to the DPCM unit 206. In accordance with an embodiment, the quantization unit 204 may use the following equation (1) to determine the first portion of bits:

$$\text{First portion of bits}=(D-Q)\text{bitplanes} \qquad (1)$$

where, "D" corresponds to a first bitdepth, and "Q" corresponds to a quantization value.

In accordance with an embodiment, the quantization unit 204 may select the first portion of bits from the plurality of bits in such a manner that a first predefined number of bits from each of the one or more pixels may constitute the first portion of the bits. For example, if the first bitdepth of the block is "8" and the quantization value is "4", the quantization unit 204 may utilize the equation (1) to determine that the first portion comprises "4" bitplanes. As discussed previously, the bitplane corresponds to a bit number of each of the one or more pixels. Therefore, "4 bits" from the one or more bits that represent each of the one or more pixels may constitute the first portion of bits. Further, as previously discussed, a number of bits in each bitplane may be equal to the count of the one or more pixels in the block. Hence, if the block comprises "32 pixels", each of the four bitplanes identified by the quantization unit 204 may include "32 bits". Therefore, the number of bits in the first portion of the bits may comprise "128 bits".

The quantization unit 204 may be further configured to reserve header bits from the bitbudget. In accordance with an embodiment, the number of bits in the header bits is predefined and may be dependent on the bitdepth. In accordance with an embodiment, the header bits may be used to store parameters that include, but are not limited to, the quantization value. For example, when the quantization value, "Q" is "4", the header may include a binary value "100" that corresponds to the quantization value, "Q".

In accordance with an embodiment, the DPCM unit 206 may be configured to compute a DPCM for each of the plurality of bits in the received quantized block (same as first portion of bits). To compute the DPCM, the DPCM unit 206 may be configured to compute a difference of each bit in the plurality of quantized bits, and a predicted bit. In accordance with an embodiment, the DPCM unit 206 may be configured to forecast the predicted bit based on the plurality of bits in another block that chronologically precedes the received quantized block. For example, the other block may correspond to a block retrieved from an image that may have been chronologically captured before the image from which the quantized block has been extracted. A person with ordinary skill in the art will understand that since the pixels are composed of the one or more bits, determination of the difference may correspond to the determination of the difference of the pixel and a predicted pixel. In accordance with an embodiment, the prediction of the pixel may be performed by a prediction unit (not shown) associated with the DPCM unit 206.

In accordance with an embodiment, based on the computed DPCM, the DPCM unit 206 may further be configured to determine a residual for each bit in the plurality of quantized bits. As the block is composed of the plurality of quantized bits and the residual is computed for each of the plurality of quantized bits, the block may comprise a plurality of residuals after the DPCM operation has been performed by the DPCM unit 206. Further, each bit of the plurality of bits in the block may represent a residual from the plurality of residuals. The DPCM unit 206 may be further configured to communicate the determined plurality of residuals to the entropy coding unit 208.

The entropy coding unit 208 may be further configured to perform source coding on the plurality of residuals. In accordance with an embodiment, the techniques for entropy coding of the plurality of quantized residuals, may include, but are not limited to, unary coding, exponential Golomb coding, Huffman coding, Universal coding, Shannon coding, Shannon-Fano coding, and/or Shannon-Fano-Elias coding.

In accordance with an embodiment, the refinement unit 210 may be configured to determine a second number of bits from the block that may correspond to the second portion of bits. In accordance with an embodiment, the second number of bits in the second portion may be determined based on the bitbudget, the count of bits consumed in by the entropy coding unit 208, and a count of bits that constitute the header bits. For example, if the bitbudget is "128 bits", the number of bits used for entropy coding is "52", and the number of bits that constitute the header bits is "3", the second number of bits that may constitute the second portion of bits is "73".

In accordance with an embodiment, the refinement unit 210 may be configured to determine a second predefined number of bits from each of the one or more bits that represent a pixel. This determination may constitute the second portion of bits. In accordance with an embodiment, the second predefined number of bits may be determined based on a second bitdepth of the block. To determine the second bitdepth, the refinement unit 210 may be configured to determine a first score and a second score, based on the count of bits that constitute the second portion of bits and a count of the one or more pixels in the block. In accordance with an embodiment, the refinement unit 210 may utilize the following equations (2) and (3) to determine the first score and the second score, respectively:

$$df=\text{floor}(L/N) \qquad (2)$$

$$dp=L\ \%\ N \qquad (3)$$

where, "df" corresponds to a first score, "dp" corresponds to a second score, "L" corresponds to a count of bits in the second portion of bits, and "N" corresponds to a count of one or more pixels in a block. The mathematical function, "floor(x)", computes a largest integer that is not greater than "x". For example, "floor (1.4)" may result in computation of a value "1". Further, "%" is the mathematical operator used to compute a modulus.

Thereafter, the refinement unit 210 may check a condition based on the following equation (4). The condition may include the determined first score, "df", the determined second score, "dp", and a pixel index, "i":

$$\text{if } \left( \left( 0 \leq i \leq \text{floor}\left(\frac{dp}{2}\right) + dp\%2 \right) \text{ or } \left( i \geq N\text{-floor}\left(\frac{dp}{2}\right) \right) \right) \quad (4)$$

$$\text{second bitdepth} = df + 1 \quad (5)$$
else
$$\text{second bitdepth} = df \quad (6)$$

With reference to the equations (4), (5), and (6), it may be observed that if the condition in the equation (4) is satisfied, the refinement unit 210 may determine the second bitdepth as "df+1", in accordance with equation (5). Otherwise, if the condition in the equation (4) is not satisfied, the refinement unit 210 may be configured to determine the second bitdepth as "df", in accordance with equation (6). In accordance with an embodiment, the second bitdepth may correspond to the second predefined number of bits from the determined second number of bits that represent each of the one or more pixels.

In accordance with an embodiment, the refinement unit 210 may perform the depth-first refinement for the second predefined number of bits determined for each of the one or more pixels. In accordance with an embodiment, the depth-first refinement process is performed pixel-wise. For example, the block may comprise three pixels and second bitdepth of each of the three pixels is "3", "2", and "3", respectively. The refinement unit 210 may perform the depth-first refinement of the three bits of the first pixel. After the depth-first refinement of the first pixel, the refinement unit 210 may perform the depth-first refinement of two bits of the second pixel, and so forth.

In accordance with an embodiment, the refinement unit 210 may be configured to generate a compressed bitstream that comprises the header bits, the entropy-coded bits of the first portion, and the refined bits of the second portion. In accordance with an embodiment, the refinement bits of the compressed bitstream is generated pixel-wise. For example, the block may comprise two pixels represented by "8 bits". The refinement bits on the bitstream is generated in such a manner that the refinement bits of the first pixel are transmitted first. Thereafter, the refinement bits of the second pixel are transmitted.

In accordance with an embodiment, the refinement unit 210 may be configured to communicate the generated, compressed bitstream to the transceiver 214. Based on the received communication, the transceiver 214 may be configured to transmit the generated bitstream to the display device 108.

Figure 3:
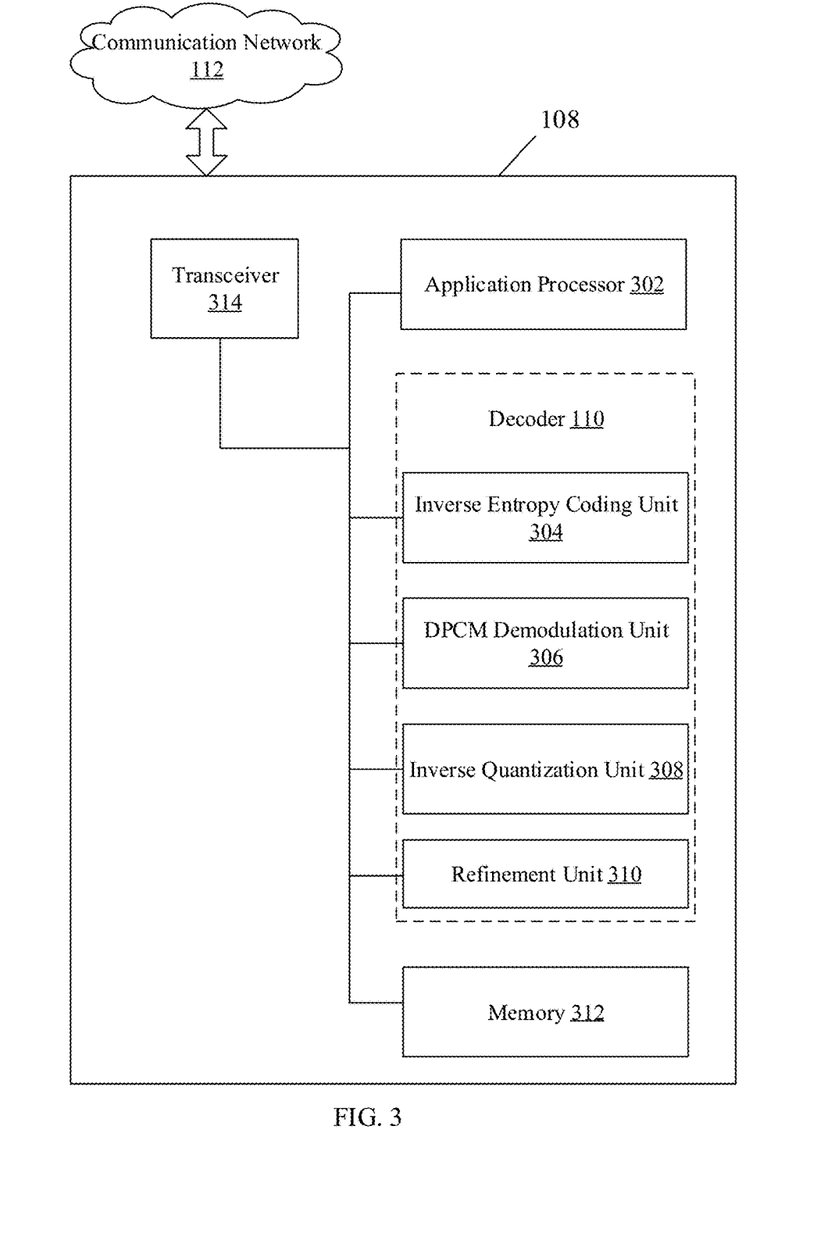
FIG. 3 is a detailed block diagram that illustrates an exemplary display device for block-based decompression of digital content, in accordance with an embodiment of the disclosure.

FIG. 3 is a block diagram that illustrates an exemplary display device for block-based decompression of digital content, in accordance with an embodiment of the disclosure. FIG. 3 is explained in conjunction with elements from FIG. 1 and FIG. 2. With reference to FIG. 3, the display device 108 may comprise one or more circuits, such as an application processor 302 and a decoder 110. The decoder 110 may further comprise an inverse entropy coding unit 304, a DPCM demodulation unit 306, an inverse quantization unit 308, and a refinement unit 310. The display device 108 may further comprise a memory 312 and a transceiver 314. The refinement unit 310, the inverse quantization unit 308, the inverse entropy coding unit 304, the DPCM demodulation unit 306, the memory 312 and the transceiver 314 may be communicatively with the application processor 302.

The application processor 302 may comprise suitable logic, circuitry, interfaces, and/or code that may be operable to execute a set of instructions stored in the memory 312. The application processor 302 may be configured to instruct the refinement unit 310, the inverse quantization unit 308, the inverse entropy coding unit 304, and the DPCM demodulation unit 306, to obtain the one or more images from a compressed bitstream received from the electronic device 102. Examples of the application processor 302 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other processors or circuits, known in the art.

The inverse entropy coding unit 304 may comprise suitable logic, circuitry, interfaces, and/or code that may be configured to decode the entropy-coded block. The inverse entropy coding unit 304 may be implemented, based on a number of technologies known in the art, such as Graphics Processing Unit (GPU), Application-Specific Integrated Circuit (ASIC), Field Programmable Gate Array (FPGA) and/or other processors or circuits, known in the art.

The DPCM demodulation unit 306 may comprise suitable logic, circuitry, interfaces, and/or code that may be configured to perform DPCM demodulation of the received compressed bitstream. The DPCM demodulation unit 306 may be implemented, based on a number of technologies known in the art, such as Graphics Processing Unit (GPU), an Application-Specific Integrated Circuit (ASIC) processor, Field Programmable Gate Array (FPGA), and/or other processors or circuits, known in the art.

The inverse quantization unit 308 may comprise suitable logic, circuitry, interfaces, and/or code that may be configured to determine the precomputed quantization value from the received compressed bitstream. The inverse quantization unit 308 may be implemented by use of Graphics Processing Unit (GPU), an Application-Specific Integrated Circuit (ASIC), Field Programmable Gate Array (FPGA), and/or other processors or circuits, known in the art.

The refinement unit 310 may comprise suitable logic, circuitry, interfaces, and/or code that may be configured to determine the refinement bits from the received compressed bitstream. Further, the refinement unit 310 may perform refinement process on the inverse quantized bits and the received bitstream to generate the one or more images. The refinement unit 310 may be implemented by use of Graphics Processing Unit (GPU), an Application-Specific Integrated Circuit (ASIC), Field Programmable Gate Array (FPGA), and/or other processors or circuits, known in the art.

The memory 312 may comprise suitable logic, circuitry, and/or interfaces that may be operable to store a machine readable code and/or a computer program with at least one code section executable by the refinement unit 310, the inverse quantization unit 308, the inverse entropy coding unit 304, and/or the DPCM demodulation unit 306. Examples of implementation of the memory 312 may include, but are not limited to, Random Access Memory (RAM), Read Only Memory (ROM), Hard Disk Drive (HDD), and/or a Secure Digital (SD) card.

The transceiver 314 may comprise suitable logic, circuitry, interfaces, and/or code that may be operable to communicate with the electronic device 102, via the communication network 112. The transceiver 314 may implement known technologies to support wired or wireless communication of the display device 108 with the communication network 112. The transceiver 314 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 314 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120 g, IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the application processor 302 of the decoder 110 may be configured to receive the compressed bitstream from the electronic device 102, via the transceiver 314. The application processor 302 may be configured to communicate the received compressed bitstream to the inverse entropy coding unit 304. In accordance with an embodiment, the inverse entropy coding unit 304 may be configured to extract header bits from the received, compressed bitstream. In accordance with an embodiment, the compressed bitstream may comprise information that corresponds to the precomputed quantization value.

In accordance with an embodiment, the inverse entropy coding unit 304 may identify the plurality of blocks from the received compressed bitstream, based on the size of the block and the first bitdepth. For example, if the size of the block is, "32×1" and the first bitdepth is, "8 bits", the inverse entropy coding unit 304 may determine that each of the plurality of blocks comprises, "256 bits". Therefore, the inverse entropy coding unit 304 may delimit the received, compressed bitstream based on the determined count of bits to identify the plurality of blocks. For brevity, the disclosure has been described with reference to a single block from the plurality of blocks. However, the scope of the disclosure is not limited to the single block.

In accordance with an embodiment, each block in the plurality of blocks comprises the plurality of bits. The inverse entropy coding unit 304 may determine the first portion of bits from the plurality of the bits based on the equation (1). As discussed (in FIG. 2), the first portion of bits is entropy-coded. The inverse entropy coding unit 304 may be configured to decode the bits in the first portion by use of one or more techniques known in the art, to determine quantized residuals of the bits in the first portion of bits.

In accordance with an embodiment, after determination of the quantized residuals, the block may comprise the plurality of residuals. In accordance with an embodiment, the value of each bit in the block may correspond to a quantized residual value determined by the inverse entropy coding unit 304. In accordance with an embodiment, the inverse entropy coding unit 304 may be further configured to transmit the block (that may comprise the plurality of quantized residuals) to the DPCM demodulation unit 306.

In accordance with an embodiment, the DPCM demodulation unit 306 may be configured to perform DPCM demodulation on the received plurality of quantized residuals. In accordance with an embodiment, the DPCM demodulation unit 306 may be configured to determine the plurality of quantized bits, based on the DPCM demodulation on the plurality of quantized residuals. The DPCM demodulation unit 306 may be further configured to transmit the block that may comprise the plurality of the quantized bits to the inverse quantization unit 308.

In accordance with an embodiment, the inverse quantization unit 308 may be configured to perform the inverse quantization on the plurality of quantized bits to obtain the first portion of bits that were originally captured by the imaging device 104. In accordance with an embodiment, the block may comprise the first portion of the plurality of original bits.

In accordance with an embodiment, the refinement unit 310 may be configured to determine the bitbudget from the memory 312. Based on the bitbudget, number of bits of the bitstream used at the inverse entropy coding unit 304, and the count of the header bits, the refinement unit 310 may be configured to determine the second number of the bits in the second portion of the bits. Further, the refinement unit 310 may be configured to determine the second bitdepth for each of the one or more pixels in the block. The second bitdepth may be deterministic of the second predefined number of bits out of the one or more bits that represent the pixel. The one or more bits may have been used for the depth-first refinement by the electronic device 102. In accordance with an embodiment, the refinement unit 310 may utilize the equations (2) to (6) to determine the second predefined number of bits for each of the one or more pixels.

In accordance with an embodiment, the refinement unit 310 may be configured to process the second predefined number of bits (that were refined by the electronic device 102) in each of the one or more pixels to obtain the second portion bits that were originally captured by the imaging device 104. In accordance with an embodiment, the block may comprise the second portion of the plurality of original bits. Thereafter, the display device 108 may be configured to render the block.

Aforementioned decoding and/or decompression of the received bitstream may be performed by the decoder 110, based on one or more techniques, such as Compute Unified Device Architecture (CUDA) language known in the art. Notwithstanding, the disclosure may not be so limited, and other such techniques may be implemented to decode and/or decompress the received bitstream, without departure from the scope of the disclosure.

Figure 4:
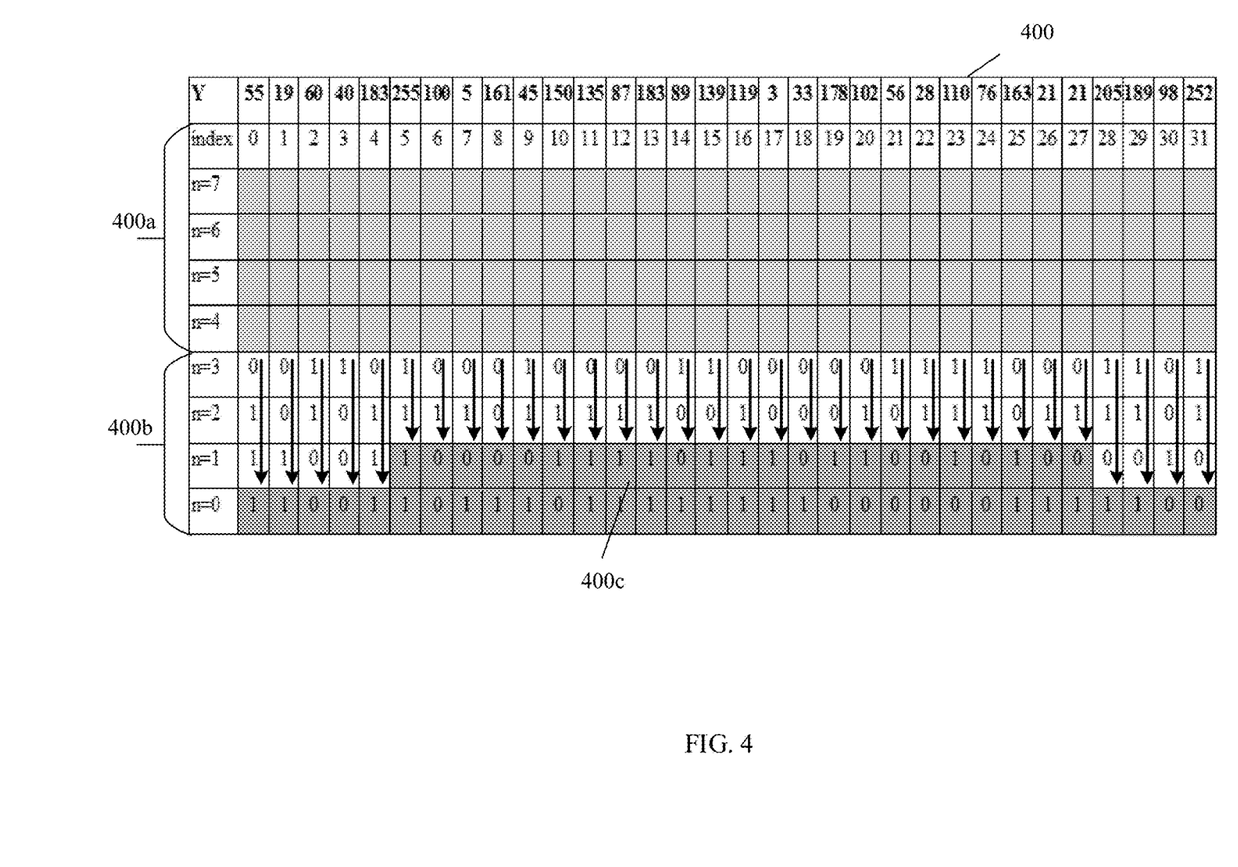
FIG. 4 is a diagram that illustrates an exemplary scenario for block-based compression and decompression of digital content, in accordance with an embodiment of the disclosure.

FIG. 4 is a diagram that illustrates an exemplary scenario for block-based compression of digital content. FIG. 4 is explained in conjunction with elements from FIG. 1, FIG. 2, and FIG. 3. With reference to FIG. 4, an exemplary block 400 coded with DPCM is illustrated. The exemplary block 400 further corresponds to an image of the one or more images captured by the imaging device 104.

In accordance with the exemplary scenario, the exemplary block 400 may comprise a first portion 400a, a second portion 400b, and a third portion 400c. The first portion 400a may correspond to the bits that are entropy-coded. The second portion 400b may correspond to the bits that may be used for refinement. The third portion 400c may comprise bits that may not be used for refinement.

The exemplary block 400 may comprise a plurality of pixels. In accordance with an exemplary scenario, the exemplary block 400 may comprise a predefined number of pixels, such as "32 pixels". Each of the pixels corresponds to the captured image of the one or more images. Each of the pixels may be assigned an index "i" from a range, such as the range, "0-31". Each of the pixels may be further associated with a pixel value "Y". The pixel value "Y" may be represented by use of an 8-bit binary value. Therefore, the number of bits, "N", in the exemplary block 400 may be, "32×8=256 bits". In accordance with an embodiment, as each pixel may be represented by eight bits, therefore the number of bitplanes in the exemplary block 400 is "8". The "8" bitplanes may be assigned a value in a decreasing order within the range "0-7". The value "7" may be assigned to the most significant bit (MSB) and the value "0" may be assigned to the least significant bit (LSB) of a pixel of the exemplary block 400. A number of bitplanes may correspond to a bitdepth, "D". For example, the bitdepth "D" of the exemplary block 400 that comprises "32 pixels" of size eight bits may be "8".

The determination of the number of bits in the first portion 400a may be based on a difference of the bitdepth "D" and a precomputed quantization value, "Q", in accordance with the equation (1). In accordance with an instance of the exemplary scenario, the value of the quantization value "Q" may be "4". Such a value may be based on a value stored in the header of the bitstream. As a result, the number of bitplanes in the first portion 400a may be determined to be "4". Consequently, the bitplanes that correspond to index "n=7" to "n=4" that comprise "32×4=128 bits", may be entropy-coded. In another embodiment, the bitplanes that correspond to index "n=0" to "n=3" that comprise "32×4=128 bits", may be used in refinement.

The determination of the number of bits in the second portion 400b may be based on the number of entropy-coded bits, number of bits used in header, and a bitbudget. The bitbudget may be based on the degree of compression. For example, for a degree of compression of "50%", the bitbudget may be, "(32×8)/2=128 bits". Further, the encoder 106 may be configured to determine the number of bits of the bitbudget. In accordance with an instance of the exemplary scenario, the number of bits in the bitbudget may be "3" and the number of entropy coded bits may be "52". Consequently, the number of bits "L" in the bitbudget available for refinement may be, "128−3−52=73 bits".

The encoder 106 may be configured to determine whether the number of bits "L" in the bitbudget available for refinement exceeds the number of bits in the second portion 400b. In instances when the number of bits "L" in the bitbudget available for refinement exceeds the number of bits in the second portion 400b, for the refinement to occur, the encoder 106 may be configured to transmit all the bits of the second portion 400b in a pixel-by-pixel sequence.

In instances when the number of bits "L" in the bitbudget available for refinement does not exceed the number of bits in the second portion 400b, the selection of bits of the pixels of the second portion 400b, for the depth-first refinement, may be based on computation of a plurality of parameters. Such plurality of parameters may comprise a first score "df" of the bits of a pixel in the second portion 400b, until which the selection of bits for depth-first refinement is to be performed. The first score "df" may be computed based on the equation (2), according to which, the computed value of the first score "df", may be "floor (73/32)=2".

Further, the plurality of parameters may comprise a second score "dp". The second score "dp" may be computed based on the equation (3). Based on the equation (1), the computed value of the second score "dp", may be "73%32=9".

Based on the determination of the partial depth parameter, the encoder 106 may be configured to determine the depth of the bitplanes for each of the pixels of the exemplary block 400, to select for depth-first refinement. The depth of the bitplanes may be based on the first score "df". The determination of the depth of the bitplanes may be performed in accordance with the condition mentioned in the equation (4).

Based on the equations (4) to (6), the pixels of the exemplary block 400 for which the pixel index "i" corresponds to the range "0 to 5" and "i" is greater than "28", the full depth parameter is "3". Further, based on the equation (4), the pixels of the exemplary block 400 for which the pixel index "i" does not correspond to the range, "6 to 27", the full depth parameter is "2", in accordance with the first score "df" computed in the equation (2).

Based on the computed first score "df", the encoder 106 may be configured to select bits for the depth-first refinement that starts from the bitplane, "n=3", and pixels that correspond to the pixel index, "i=0". The encoder 106 may be configured to similarly select bits of the bitplanes, "n=2" and "n=1", for the pixel index "i=0", in accordance with the computed first score "df" in the equation (2).

Subsequent to the selection of bits that corresponds to the pixel index, "i=0", the encoder 106 may be configured to select bits from pixel indices, "i=1 to 4", in a similar pattern. For pixel indices, "i=5 to 27", the encoder 106 may be configured to sequentially select bits that correspond to the bitplanes, "n=3" and "n=2". Such an exclusion of bits of the bitplane, "n=1" may be based on the computed first score "df", in the equation (2), in accordance with the conditions specified in the equations (4) to (6). The excluded bits that correspond to the bitplanes, "n=0" and "n=1", may correspond to the third portion 400c. Subsequent to the selection of bits that correspond to the pixel index, "i=5 to 27", the encoder 106 may be configured to select bits from the pixel indices, "i=28 to 31", in a pattern similar to the selection of the bits of pixels index, "i=0 to 5". The pattern of selection of bits is further illustrated by the arrows depicted in the FIG. 4.

In accordance with an instance of the exemplary scenario, the encoder 106 may be configured to transmit the selected bits of the pixels of the exemplary block 400 to the decoder 110 as a compressed bitstream. The decoder 110 may be configured to decode the received bitstream based on the DPCM demodulation. The decoder 110 may be configured to perform inverse entropy coding on the bits of the received bitstream that correspond to the first portion 400a. The decoder 110 may be further configured to read the bits of the exemplary block 400 in a depth-first sequence similar to the sequence for selection of bits of the pixels for depth-first refinement.

Figure 5:
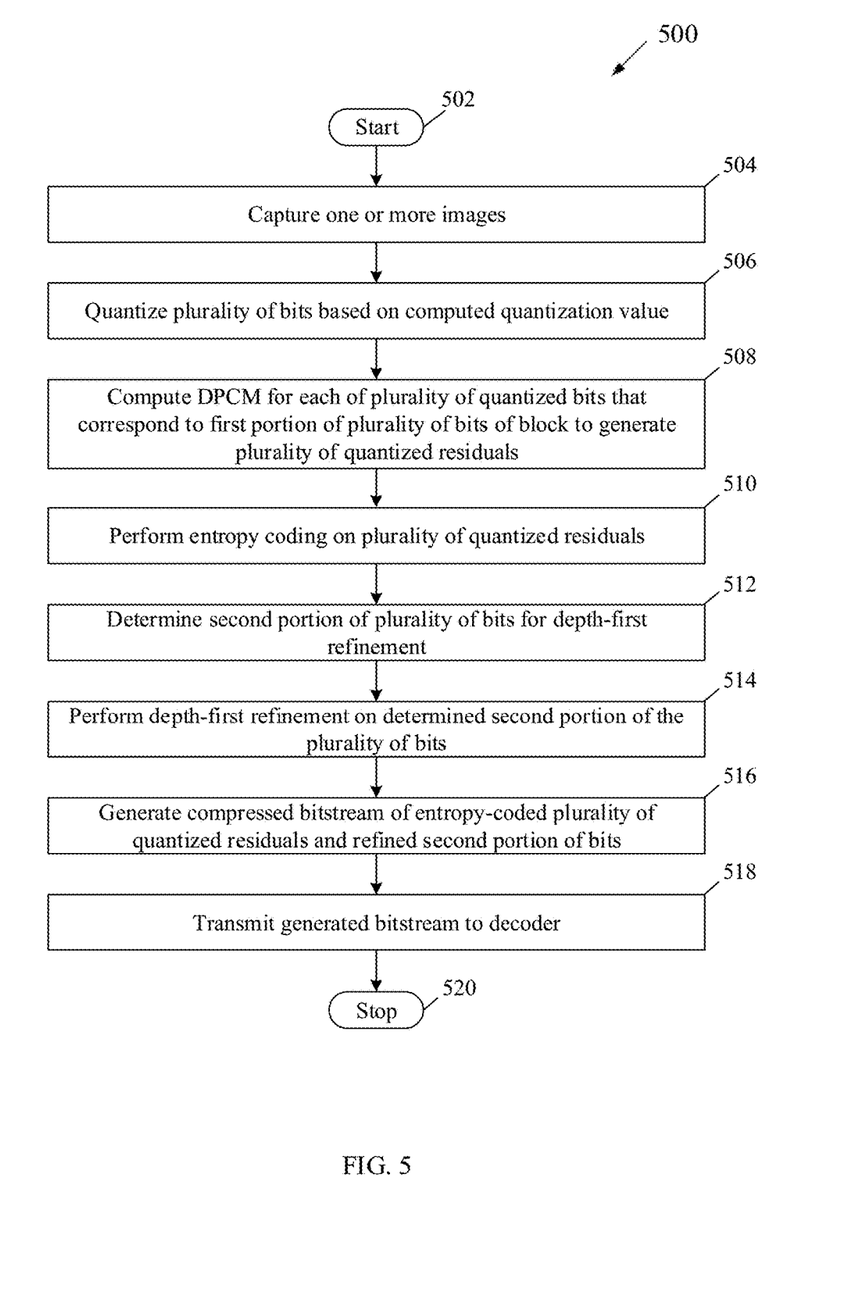
FIG. 5 is a first flowchart that illustrates a method for block-based compression of digital content, in accordance with an embodiment of the disclosure.

FIG. 5 is a first flowchart that illustrates a method for block-based compression of digital content, in accordance with an embodiment of the disclosure. With reference to FIG. 5, there is shown a flowchart 500. The flowchart 500 is described in conjunction with FIG. 1. The method, implemented at the encoder 106, starts at step 502 and proceeds to step 504.

At step 504, one or more images that correspond to a digital content may be captured by the imaging device 104. The captured one or more images may comprise a plurality of blocks. The plurality of blocks may further comprise one or more pixels. Each of the one or more pixels may comprise a plurality of bits.

At step 506, the plurality of bits may be quantized based on a computed quantization value, determined by the mode decision unit. The plurality of quantized bits may correspond to a first portion of bits of the plurality of bits of the block. At step 508, DPCM for each of the plurality of quantized bits may be computed. Based on the computation of the DPCM, a plurality of quantized residuals may be generated that correspond to the plurality of quantized bits.

At step 510, the entropy coding may be performed on the plurality of quantized residuals. At step 512, a second portion of the plurality of (original) bits may be determined for a depth-first refinement. The depth-first refinement of the second portion may be based on an available bitbudget. The available bitbudget for refinement may be further based on a determined degree of compression for the compression of the plurality of quantized residuals of the captured digital content. At step 514, depth-first refinement may be performed based on the determined second portion of the plurality of (original) bits.

At step 516, a compressed bitstream of the entropy-coded plurality of quantized residuals and refined second portion of bits may be generated by the encoder 106. At step 518, the generated bitstream may be transmitted to the decoder 110. The control passes to the end step 520.

Figure 6:
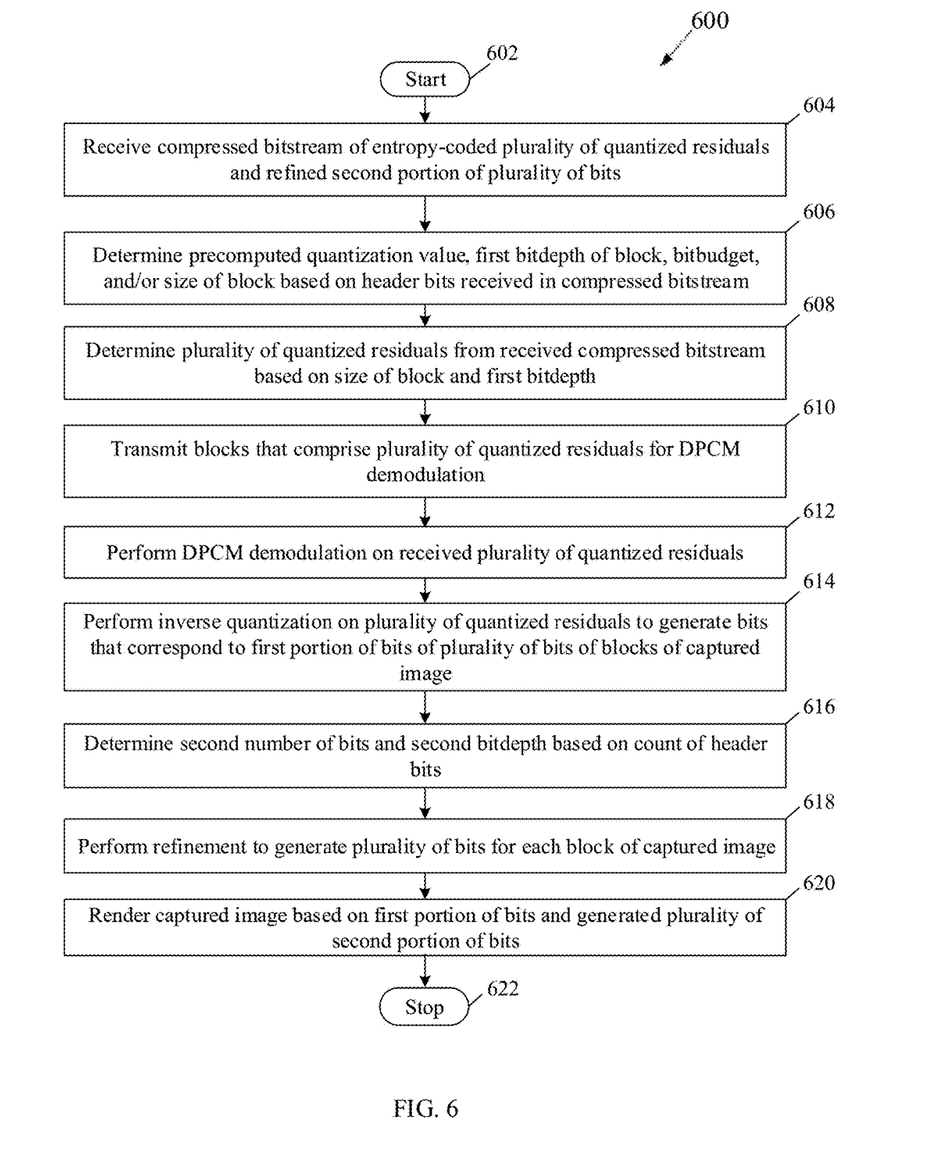
FIG. 6 is a second flowchart that illustrates a method for block-based decompression of digital content, in accordance with an embodiment of the disclosure.

FIG. 6 is a second flowchart that illustrates a method for block-based decompression of digital content, in accordance with an embodiment of the disclosure. With reference to FIG. 6, there is shown a flowchart 600. The flowchart 600 is described in conjunction with FIG. 1. The method, implemented at the decoder 110, starts at step 602 and proceeds to step 604.

At step 604, a compressed bitstream of the entropy-coded plurality of quantized residuals (first portion of bits) and refined second portion of bits, may be received from the encoder 106. The plurality of quantized residuals may correspond to a plurality of blocks of a captured digital content. At step 606, a precomputed quantization value, a first bitdepth of a block, a bitbudget, and a size of the block, may be determined, by the inverse entropy coding unit 304, based on the header bits received in the compressed bitstream and from the memory. In accordance with an embodiment, one or more of the quantization value, the first bitdepth of the block, the bitbudget, and the size of the block, may be retrieved, by the inverse entropy coding unit 304, from the memory 312. At step 608, the plurality of quantized residuals may be determined from the received compressed bitstream based on the size of the block and the first bitdepth, by the inverse entropy coding unit 304.

At step 610, the blocks that comprise the plurality of quantized residuals may be transmitted to the DPCM demodulation unit 306 for demodulation. At step 612, the DPCM demodulation may be performed on the received plurality of quantized residuals by the DPCM demodulation unit 306. The demodulated plurality of quantized residuals may be transmitted to the inverse quantization unit 308 for inverse quantization. At step 614, inverse quantization may be performed on the plurality of quantized residuals to generate the bits that correspond to a first portion of bits of the plurality of bits of the blocks of image captured by the imaging device 104.

At step 616, based on the bitbudget and the count of the header bits for depth-first refinement, a second number of bits and a second bitdepth that corresponds to the second portion of the bits, may be determined, by the refinement unit 310. At step 618, refinement may be performed, by the refinement unit 310, to generate plurality of second portion of bits for each block of the captured image. Such a refinement may be based on second number of bits and a second bitdepth that corresponds to the second portion of the bits. At step 620, the captured image may be rendered at the display device 108, based on the first portion of bits and generated plurality of second portion of bits. The control passes to end step 622.

In accordance with an embodiment of the disclosure, the system for block-based compression of digital content may comprise one or more circuits, such as the encoder 106 (as shown in FIG. 2). The encoder 106 may be configured to quantize each block of a plurality of blocks of a digital content based on a computed quantization value. The encoder 106 may be configured to compute a DPCM. The DPCM may be computed to generate quantized residuals of the quantized plurality of blocks. The encoder 106 may be configured to perform entropy coding on each of the quantized plurality of blocks based on the generated quantized residuals. The encoder 106 may be configured to generate a compressed bitstream of the digital content. The digital content may comprise depth-first refinement of the entropy-coded quantized plurality of blocks.

In accordance with an embodiment of the disclosure, the system for block-based decompression of digital content may comprise one or more circuits, such as the decoder 110 (as shown in FIG. 3). The decoder 110 may be configured to receive a compressed bitstream of the digital content that comprises a quantized plurality of blocks. The decoder 110 may be further configured to decode a precomputed quantization value from a plurality of bits of the compressed bitstream, received by the decoder. The decoder 110 may be further configured to decode a plurality of quantized residuals based on the decoded precomputed quantization value. Each of the decoded plurality of quantized residuals corresponds to a quantized block of the quantized plurality of blocks. The decoder 110 may be further configured to determine a plurality of samples based on the decoded plurality of quantized residuals. The decoder 110 may be further configured to read one or more refinement bits in a depth-first sequence from the determined plurality of samples for the decompression of the digital content.

Various embodiments of the disclosure may provide a non-transitory, computer readable medium and/or storage medium, and/or a non-transitory machine readable medium and/or storage medium stored thereon, a machine code and/or a computer program with at least one code section executable by a machine and/or a computer for block-based compression of digital content. The at least one code section may cause the machine and/or computer to perform the steps that comprise quantization by an encoder, of each block of a plurality of blocks of a digital content, based on a computed quantization value. A differential pulse code modulation (DPCM) may be computed by the encoder. The DPCM may be computed to generate quantized residuals of the quantized plurality of blocks. The encoder may further perform entropy coding on each of the quantized plurality of blocks based on the generated quantized residuals. The encoder may further generate a compressed bitstream of digital content that may comprise depth-first refinement of the entropy-coded quantized plurality of blocks.

Various embodiments of the disclosure may provide a non-transitory, computer readable medium and/or storage medium, and/or a non-transitory machine readable medium and/or storage medium stored thereon, a machine code and/or a computer program with at least one code section executable by a machine and/or a computer for block-based decompression of digital content. The code section may cause the machine and/or computer to perform the steps that comprise reception of a compressed bitstream of the digital content that comprises a quantized plurality of blocks, at a decoder. The decoder may further decode a precomputed quantization value from a plurality of bits of the compressed bitstream, received by the decoder. The decoder may further decode a plurality of quantized residuals based on the decoded precomputed quantization value. Each of the decoded plurality of quantized residuals corresponds to a quantized block of the quantized plurality of blocks. The decoder may further determine a plurality of samples based on the decoded plurality of quantized residuals. The decoder may further read one or more refinement bits in a depth-first sequence from the determined plurality of samples for the decompression of the digital content.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, comprising:
   circuitry configured to:
   quantize each block of a plurality of blocks of digital content based on a quantization value;
   determine a differential pulse code modulation (DPCM) to generate quantized residuals of said quantized plurality of blocks;
   entropy code said generated quantized residuals; and
   generate a compressed bitstream of said digital content, based on a count of bits for depth-first refinement in each block of said plurality of blocks,
   wherein said generated compressed bitstream comprises said depth-first refinement in each block of said plurality of blocks.

2. The system according to claim 1, wherein said count of bits for said depth-first refinement is determined based on a number of bits of said quantized plurality of blocks that are entropy-coded.

3. The system according to claim 1, wherein said count of bits for said depth-first refinement is determined based on a number of bits of said quantized plurality of blocks.

4. The system according to claim 1, wherein said generation of said compressed bitstream is based on a degree of compression of said plurality of blocks.

5. The system according to claim 4, wherein said degree of compression corresponds to at least one of a user-defined value or a pre-stored value.

6. The system according to claim 1, said circuitry is further configured to determine a bitdepth of said plurality of blocks, for said depth-first refinement, based on at least one of a size of a block in said plurality of blocks, said quantization value, a degree of compression, and said count of bits for said depth first refinement from each of said quantized plurality of blocks.

7. The system according to claim 1, wherein said quantization of said each block of said plurality of blocks is based on said quantization value determined by a mode decision unit.

8. The system according to claim 1, wherein said entropy code corresponds to at least one of a Golomb coding, a Universal coding, a Huffman coding, or an Arithmetic coding.

9. A system, comprising:
   circuitry configured to:
   receive a compressed bitstream of digital content comprising a plurality of quantized blocks;
   decode a quantization value from a plurality of bits of said compressed bitstream;
   decode a plurality of quantized residuals from said compressed bitstream, based on said decoded quantization value,
   wherein each residual of said plurality of quantized residuals corresponds to a quantized block of said plurality of quantized blocks;
   determine a plurality of quantized samples based on said decoded plurality of quantized residuals; and
   read at least one refinement bit in a depth-first sequence from said determined plurality of quantized samples for decompression of said digital content, based on a number of bits in a header of said compressed bitstream.

10. The system according to claim 9, wherein said received compressed bitstream of said digital content is entropy-coded.

11. The system according to claim 9, wherein said compressed bitstream is decoded based on a differential pulse code modulation (DPCM) decoder.

12. A method, comprising:
   quantizing, by an encoder, each block of a plurality of blocks of digital content based on a quantization value;
   determining, by said encoder, a differential pulse code modulation (DPCM) to generate quantized residuals of said quantized plurality of blocks;
   entropy coding, by said encoder, said generated quantized residuals; and
   generating, by said encoder, a compressed bitstream of said digital content, based on a count of bits for depth-first refinement in each block of said plurality of blocks,
   wherein said generated compressed bitstream comprises said depth-first refinement in each block of said plurality of blocks.

13. The method according to claim 12, wherein said count of bits for said depth-first refinement is determined based on a number of bits of said quantized plurality of blocks that are entropy-coded.

14. The method according to claim 12, wherein said count of bits for said depth-first refinement is determined based on a number of bits of said quantized plurality of blocks.

15. The method according to claim 12, wherein said generation of said compressed bitstream is based on a degree of compression of said plurality of blocks.

16. The method according to claim 15, wherein said degree of compression corresponds to at least one of a user-defined value, or a pre-stored value.

17. The method according to claim 12, further comprising determining, by said encoder, a bitdepth of said plurality of blocks, for said depth-first refinement, based on at least one of a size of a block in said plurality of blocks, said quantization value, a degree of compression, and said count of bits for said depth first refinement in each block of said quantized plurality of blocks.

18. The method according to claim 12, wherein said quantization of said each block of said plurality of blocks is based on said quantization value determined by a mode decision unit.

19. The method according to claim 12, wherein said entropy coding corresponds to at least one of a Golomb coding, a Universal coding, a Huffman coding, or an Arithmetic coding.

20. A method, comprising:
receiving, at a decoder, a compressed bitstream of digital content comprising a plurality of quantized blocks;
decoding, by said decoder, a quantization value from a plurality of bits of said compressed bitstream;
decoding, by said decoder, a plurality of quantized residuals from said compressed bitstream based on said decoded quantization value,
wherein each residual of said plurality of quantized residuals corresponds to a quantized block of said plurality of quantized blocks;
determining, by said decoder, a plurality of quantized samples based on said decoded plurality of quantized residuals; and
reading, by said decoder, at least one refinement bit in a depth-first sequence from said determined plurality of samples for decompression of said digital content, based on a number of bits in a header of said compressed bitstream.

21. The method according to claim 20, wherein said received compressed bitstream of said digital content is entropy-coded.

22. The method according to claim 20, wherein said decoding of said received compressed bitstream is based on a differential pulse code modulation (DPCM) decoder.

* * * * *